(12) United States Patent
Bender et al.

(10) Patent No.: US 8,177,039 B2
(45) Date of Patent: May 15, 2012

(54) HYDRAULIC VEHICLE BRAKE SYSTEM AND METHOD FOR OPERATING THE HYDRAULIC VEHICLE BRAKE SYSTEM

(75) Inventors: Ralf Bender, Hofheim (DE); Wilhelm Beer, Ruesselsheim (DE); Patrick Schlitt, Schlitz (DE); Jan Moessinger, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 241 days.

(21) Appl. No.: 12/668,913

(22) PCT Filed: May 19, 2008

(86) PCT No.: PCT/EP2008/056118
§ 371 (c)(1),
(2), (4) Date: Jan. 13, 2010

(87) PCT Pub. No.: WO2009/010323
PCT Pub. Date: Jan. 22, 2009

(65) Prior Publication Data
US 2010/0181824 A1      Jul. 22, 2010

(30) Foreign Application Priority Data

Jul. 14, 2007 (DE) .......................... 10 2007 032 948
Apr. 25, 2008 (DE) .......................... 10 2008 020 856

(51) Int. Cl.
*B60T 8/44* (2006.01)
(52) U.S. Cl. ..................................... 188/152; 303/114.1
(58) Field of Classification Search ............... 303/114.1; 60/547.1, 548–582; 188/152
See application file for complete search history.

(56) References Cited

U.S. PATENT DOCUMENTS

| | | | | |
|---|---|---|---|---|
| 3,253,409 A | * | 5/1966 | Kellogg et al. | 60/329 |
| 3,787,029 A | | 1/1974 | Shellhause | |
| 4,034,566 A | * | 7/1977 | Suketomo et al. | 60/548 |
| 4,131,055 A | | 12/1978 | Erwin | |

(Continued)

FOREIGN PATENT DOCUMENTS

DE     34 22 292     12/1985

(Continued)

OTHER PUBLICATIONS

International Search Report for PCT/EP2008/056118 dated Feb. 4, 2009.
German Search Report for DE 10 2008 020 856.6 dated Oct. 27, 2008.

*Primary Examiner* — Christopher Schwartz
(74) *Attorney, Agent, or Firm* — RatnerPrestia

(57) ABSTRACT

A hydraulic vehicle brake system, which has a brake pressure signal generator which can be activated by a brake activation device, wherein the brake pressure signal generator can be connected to wheel brakes of the vehicle via at least one hydraulic line and is composed essentially of a master brake cylinder and a hydraulic booster which is connected upstream and which has a return flow chamber and a boosting chamber, a working piston arranged therein and a control piston, wherein the working piston is operatively connected in the force outputting direction to a master brake cylinder piston via an activation element, and a hydraulic pressure of a hydraulic pressure source can be applied to the booster via an inlet for the purpose of boosting braking force, wherein an outlet of the booster can be connected to a reservoir vessel.

18 Claims, 10 Drawing Sheets

U.S. PATENT DOCUMENTS

| | | | |
|---|---|---|---|
| 4,655,512 A | 4/1987 | Leiber | |
| 5,924,284 A | 7/1999 | Shimada et al. | |
| 6,161,380 A | 12/2000 | Yamashita et al. | |
| 6,652,040 B2 * | 11/2003 | Oka et al. | 303/114.1 |
| 6,789,857 B2 * | 9/2004 | Kusano | 303/114.1 |
| 6,955,407 B2 * | 10/2005 | Tsubouchi et al. | 303/114.1 |
| 2005/0023891 A1 * | 2/2005 | Terazawa et al. | 303/114.1 |

FOREIGN PATENT DOCUMENTS

| | | |
|---|---|---|
| DE | 34 40 972 | 5/1986 |
| DE | 40 12 958 | 10/1991 |
| DE | 41 09 460 | 9/1992 |

\* cited by examiner

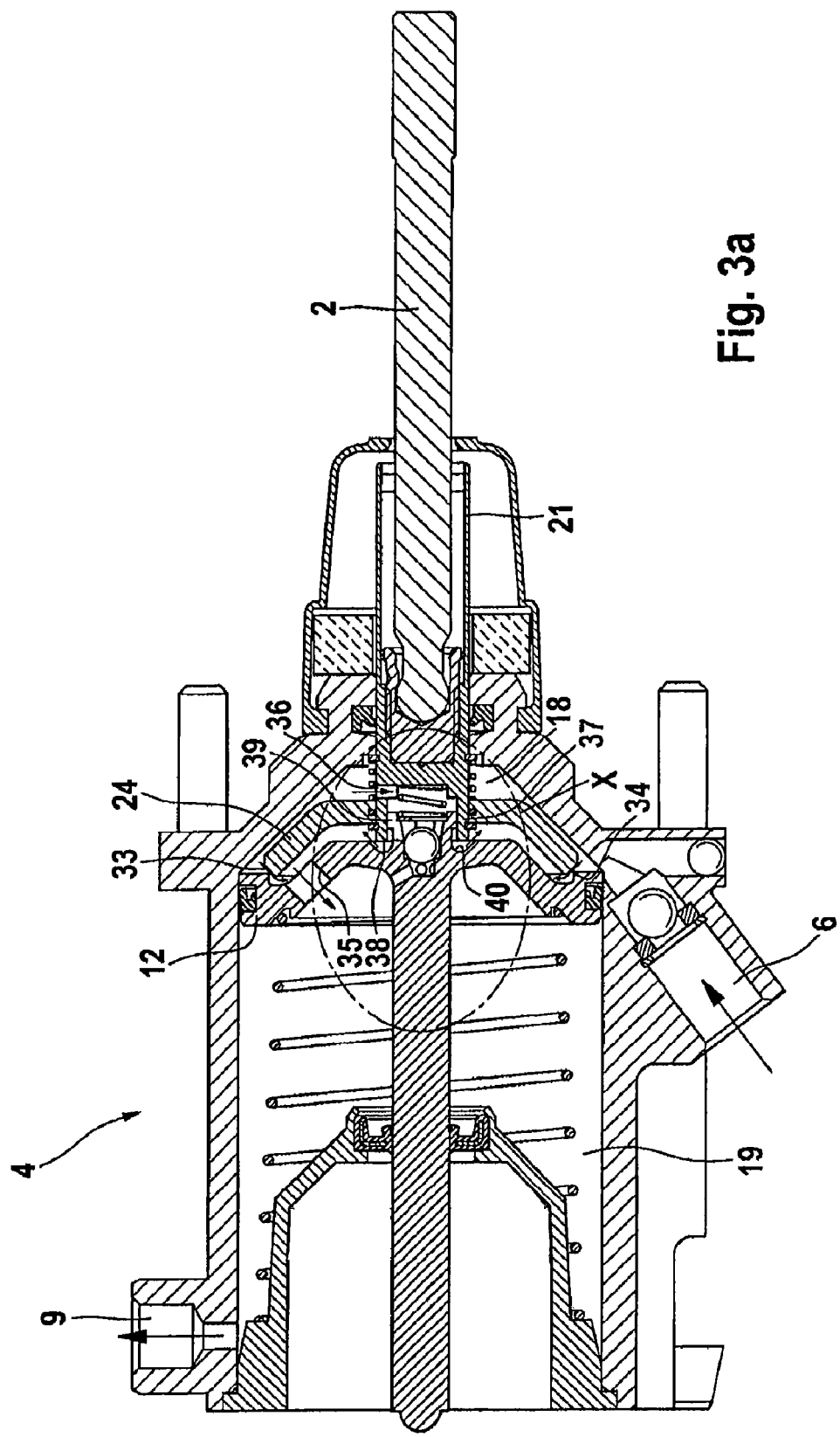

HYDRAULIC VEHICLE BRAKE SYSTEM AND METHOD FOR OPERATING THE HYDRAULIC VEHICLE BRAKE SYSTEM

CROSS REFERENCE TO RELATED APPLICATIONS

This application is the U.S. national phase application of PCT International Application No. PCT/EP2008/056118, filed May 19, 2008, which claims priority to German Patent Application No. DE 10 2007 032 948.4, filed Jul. 14, 2007, and German Patent Application No. DE 10 2008 020 856.6 filed Apr. 25, 2008, the contents of such applications being incorporated herein by reference.

FIELD OF THE INVENTION

The invention relates to a hydraulic vehicle brake system, which has a brake pressure signal generator which can be activated by a brake activation device, wherein the brake pressure signal generator can be connected to wheel brakes of the vehicle via a hydraulic line and is composed essentially of a master brake cylinder and a hydraulic booster which is connected upstream and which has a return flow chamber and a boosting chamber, a working piston arranged therein and a control piston, wherein the working piston is operatively connected in the force outputting direction to a master brake cylinder piston via an activation element, and a hydraulic pressure of a hydraulic pressure source can be applied to the booster via an inlet for the purpose of boosting braking force, wherein an outlet of the booster can be connected to a reservoir vessel.

BACKGROUND OF THE INVENTION

Such a hydraulic vehicle brake system is known, for example, from *das Bremsendhandbuch* [Brake Manual], 6th edition, Bartsch Verlag. Pressure is applied to the hydraulic booster of the brake pressure signal generator which is known therefrom, by means of an accumulator with an accumulator storage device, the accumulator storage device being fed by a steering pump. It is considered disadvantageous in the known vehicle brake system that the hydraulic booster does not provide the driver of the vehicle with any good feedback at his brake pedal.

SUMMARY OF THE INVENTION

An object of the invention is therefore to make available a vehicle brake system which is improved to the effect that the hydraulic booster thereof permits desired feedback to be provided to the driver, and which is also of lightweight and compact design. In addition, it is desirable that large boosting factors can be implemented.

This object is achieved according to aspects of the invention by virtue of the fact that the control piston has a plate-shaped actuation piston which is arranged thereon and which interacts with the working piston, and the control piston is provided guided in the working piston in such a way that, when the booster is activated, two-stage throttling of the volume flow between the boosting chamber and the return flow chamber is made possible in order to build up pressure in the boosting chamber. As a result, what is referred to as a jumper function can be implemented. In addition, the pressure which builds up in the boosting chamber acts on the activation side as feedback for the driver, with the faces being capable of being adapted in a variable fashion to customers' wishes by virtue of the multi-component nature of the piston unit. As a result, jumpers and feedback can be set to the desired requirements.

One advantageous embodiment of the invention provides that the actuation piston is provided prestressed against a stop by means of a spring element in the force outputting direction, wherein the spring element bears against a further stop. The stops permit formation of an assembly and during operation additionally secure the control piston in the housing of the booster.

In this context, the stops are preferably provided as locking rings which are configured in a simple way, are easy to mount and are attached to the control piston. A compact design of the booster is preferably obtained by virtue of the fact that the working piston has, for the purpose of guidance in the control piston, a cylindrical guide section which is guided on an inner side of a pot-shaped end of the control piston, wherein the guide section has one or more breakthroughs which permit first throttling of the volume flow, and on an end side of the control piston a sealing edge is provided which can be brought to bear against a sealing face of the working piston.

The sealing face of the working piston is easy to manufacture by virtue of the fact that the sealing face is formed in a circumferential annular groove of the working piston.

According to one advantageous embodiment of the invention, the breakthroughs are provided as slits. As a result, they can easily be made in the control piston.

According to one preferred embodiment of the invention, a particularly compact design can be obtained by virtue of the fact that the working piston is embodied in a plate shape and has a sealing edge against which the actuation piston can be brought to bear with a circumferential outer face.

The required hydraulic volume can be minimized by virtue of the fact that an end side of the booster is embodied in a cone shape. The end side can therefore be adapted to the plate shape of the actuation piston.

In order to reduce the number of components and simplify mounting, the working piston and the activation element are provided in one piece.

According to one advantageous embodiment, a mechanical fallback level can be provided by virtue of the fact that a nonreturn valve, which permits pressure equalization between the return flow chamber and the boosting chamber in the event of failure of the hydraulic pressure source, is provided between the working piston and the control piston.

In the case of heavy vehicles, in which the foot force is not sufficient as a fallback level, it is possible, according to one advantageous embodiment of the invention, for the hydraulic booster to have an electrical fallback level in addition to a mechanical fallback level.

The booster preferably has a nonreturn valve in the inlet and a flow control switch in the outlet, and an electrically driven pump is arranged on the booster, wherein in the event of failure of the pressure source the pump feeds the volume into the boosting chamber from the return flow chamber.

A method according to aspects of the invention for operating the hydraulic vehicle brake system according to aspects of the invention provides that the build-up in pressure in the boosting chamber is carried out by means of two-stage throttling of the volume flow.

BRIEF DESCRIPTION OF THE DRAWINGS

Further features and advantages of the invention emerge from the following description of two exemplary embodiments on the basis of the drawing, in which, in each case in a highly schematic form and in section:

FIGS. 3a, 3b show the hydraulic booster of the brake pressure signal generator according to FIG. 2 in the inactivated state, on an enlarged scale;

DETAILED DESCRIPTION OF THE PREFERRED EMBODIMENTS

Figure 1:
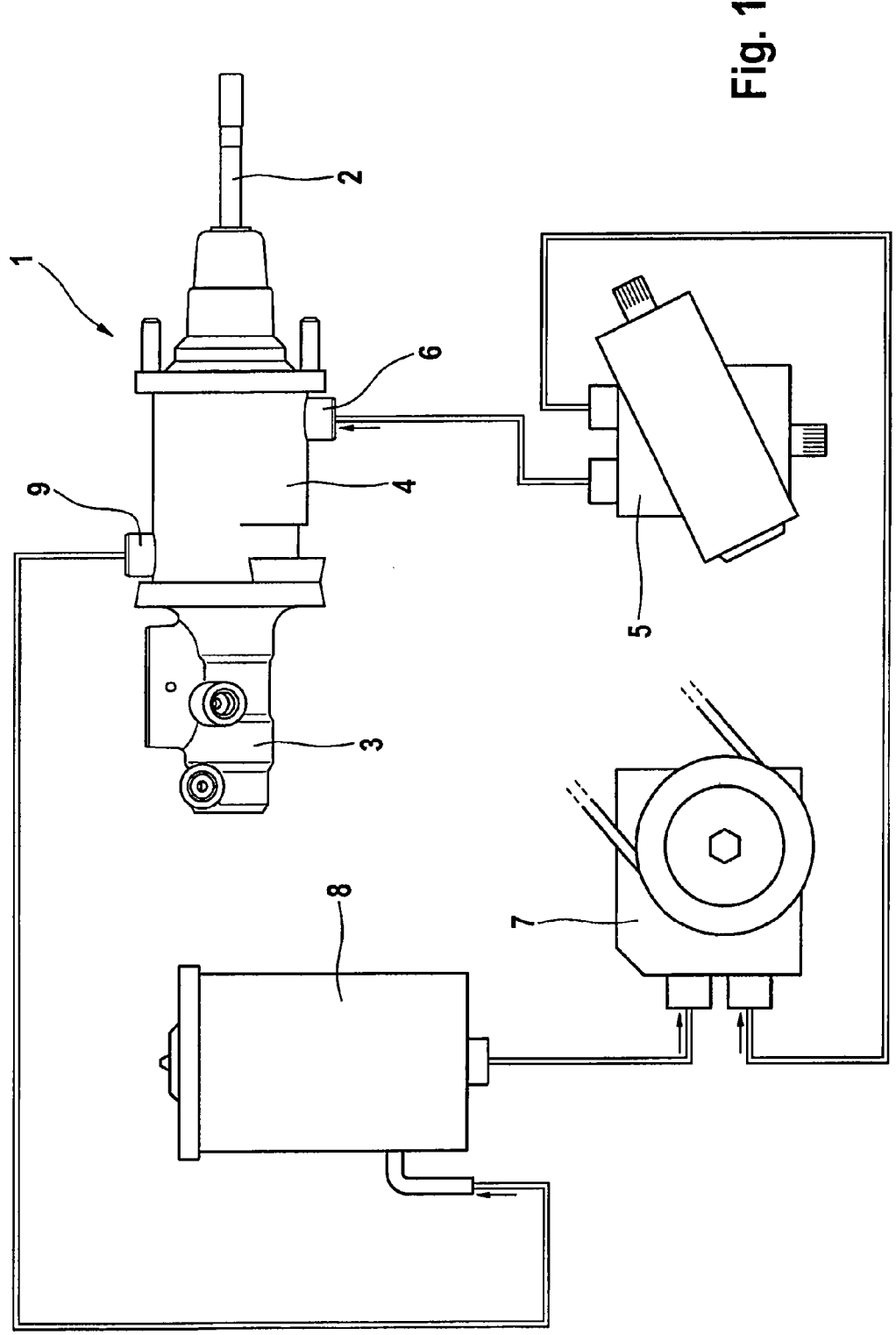
FIG. 1 shows a hydraulic switching diagram of a first embodiment of a vehicle brake system according to aspects of the invention with a brake pressure signal generator.

FIG. 1 shows a hydraulic switching diagram of a hydraulic vehicle brake system with a brake pressure signal generator 1. The brake pressure signal generator 1, which can be connected to wheel brakes of the vehicle via at least one hydraulic line, can be activated by means of a brake activation device comprising a piston rod 2 with a brake pedal (not shown) which is attached thereto.

As is apparent, the brake pressure signal generator 1 is connected into a hydraulic circuit of a power steering system in series between a steering gear mechanism 5 and a reservoir vessel 8. The brake pressure signal generator 1 is composed essentially of a master brake cylinder 3, which can also be embodied as a tandem master brake cylinder, and a hydraulic booster 4 connected upstream.

An inlet 6 of the hydraulic booster 4 is connected to the steering gear mechanism 5, wherein a hydraulic pressure of a steering pump 7 as a hydraulic pressure source can be applied to the booster 4 via the steering gear mechanism 5 and the inlet 6 for the purpose of boosting the braking force. The steering pump 7 is fed by the reservoir vessel 8, to which an outlet 9 of the hydraulic booster 4 is connected.

Figure 2:
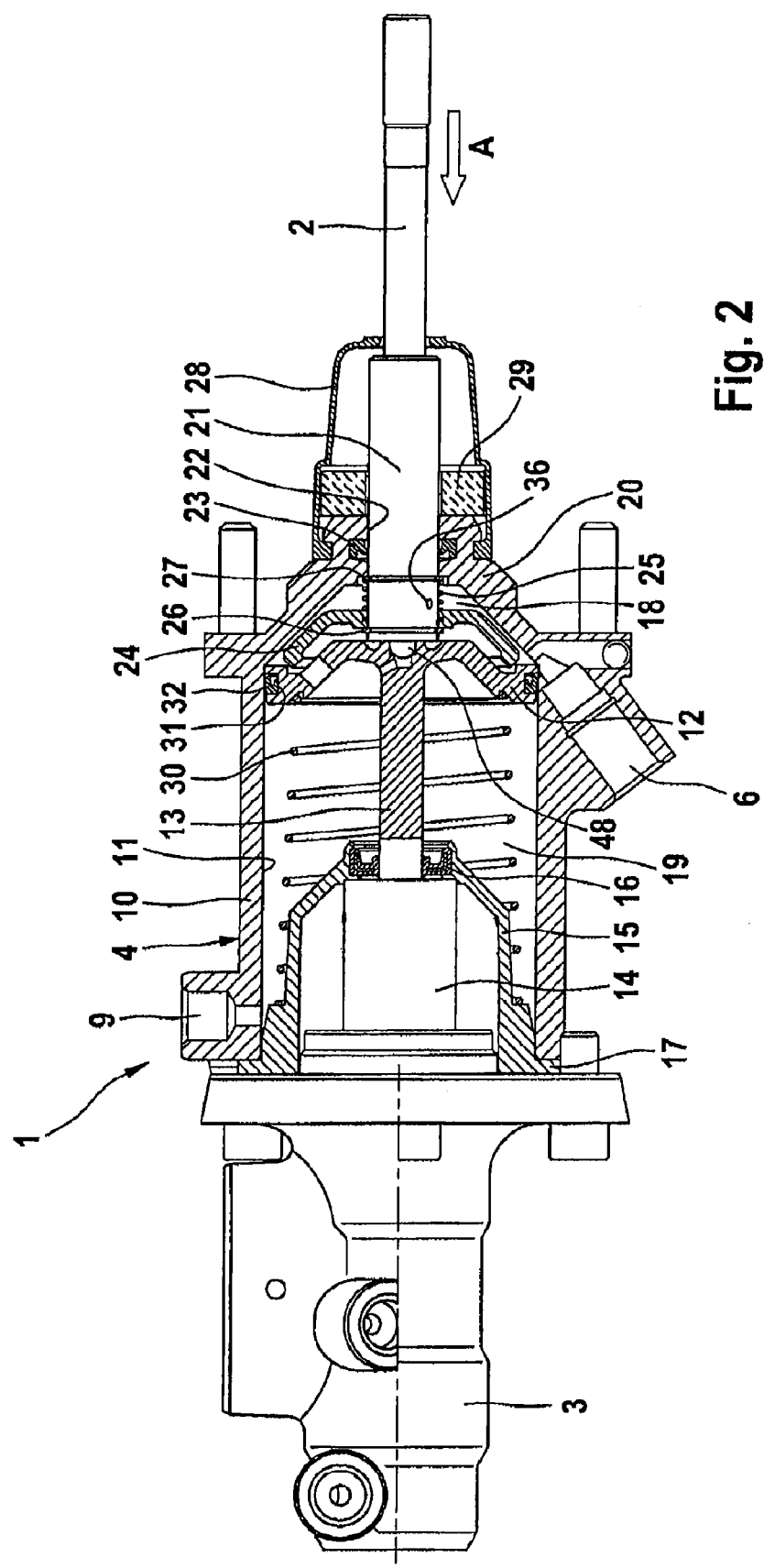
FIG. 2 shows the brake pressure signal generator according to FIG. 1, partially in longitudinal section.

The structural layout of the hydraulic booster 4 and its particularly compact design are apparent from FIG. 2, which shows the brake pressure signal generator 1 partially in longitudinal section.

The hydraulic booster 4 has a housing 10 with a longitudinal bore 11 in which a plate-shaped working piston 12 is provided in such a way that it can be displaced axially and is guided radially. In the force outputting direction, which is illustrated according to an arrow A and which at the same time indicates the direction of activation of the booster 4, the working piston 12 is operatively connected to a master brake cylinder piston 14 via an activation element 13. The master brake cylinder 3 is not illustrated in detail since its design and its function are generally known. It can be embodied with a single circuit or two circuits.

As is known from FIG. 2, the activation element 13 is embodied in one piece with the working piston 12, as a result of which the number of components of the booster 4 can be reduced and the mounting simplified. However, it is also conceivable to provide the activation element 13 as a separate component which is connected to the working piston 12.

The hydraulic circuits of the booster 4 and of the master brake cylinder 3 are separated from one another in a fluid-tight fashion by means of a bell 15, with a media-separating element 16, by means of which the activation element 13 can be guided in a sealed fashion, being arranged in the base of the bell 15. An edge 17 of the bell 15 is arranged between the housing 10 of the booster 4 and the master brake cylinder 3, which are screwed to one another. A sealing element (not illustrated) ensures fluid-tight screwing.

The working piston 12 divides the housing 10 into a boosting chamber 18 and a return flow chamber 19, wherein the boosting chamber 18 is provided between the working piston 12 and a conical end side 10 of the booster 4, and the return flow chamber 19 is bounded by the working piston 12, the housing 10 and the bell 15.

A control piston 21 extends through an axial opening 22 in the end side 20 and is connected to the piston rod 2 of the brake pedal (not illustrated). The opening 22 is sealed by means of a sealing collar 23 which is provided in the housing 10. In order to avoid dirt penetrating into the booster 4, a protective cap 28 is also attached to the end sides 20, in which cap a felt ring 29, which surrounds the control piston 21, is arranged.

A plate-shaped actuation piston 24 is arranged in an axially guided fashion on the control piston 21, wherein the actuation piston 24 is provided prestressed against a stop in the activation direction A by means of a spring element 25. The stop is formed by a locking ring 26 which is attached to the control piston 21. A further locking ring 27 forms a stop for the spring element 25 and at the same time secures the control piston 21 in the housing 10 of the booster 4.

As is also apparent from FIG. 2, the working piston 12 is prestressed counter to the activation direction A by a spring element 30, and sealing element 32 in the from of a collar for sealing purposes is provided in a groove 31 formed on the circumference of the working piston 12.

Figure 3B:
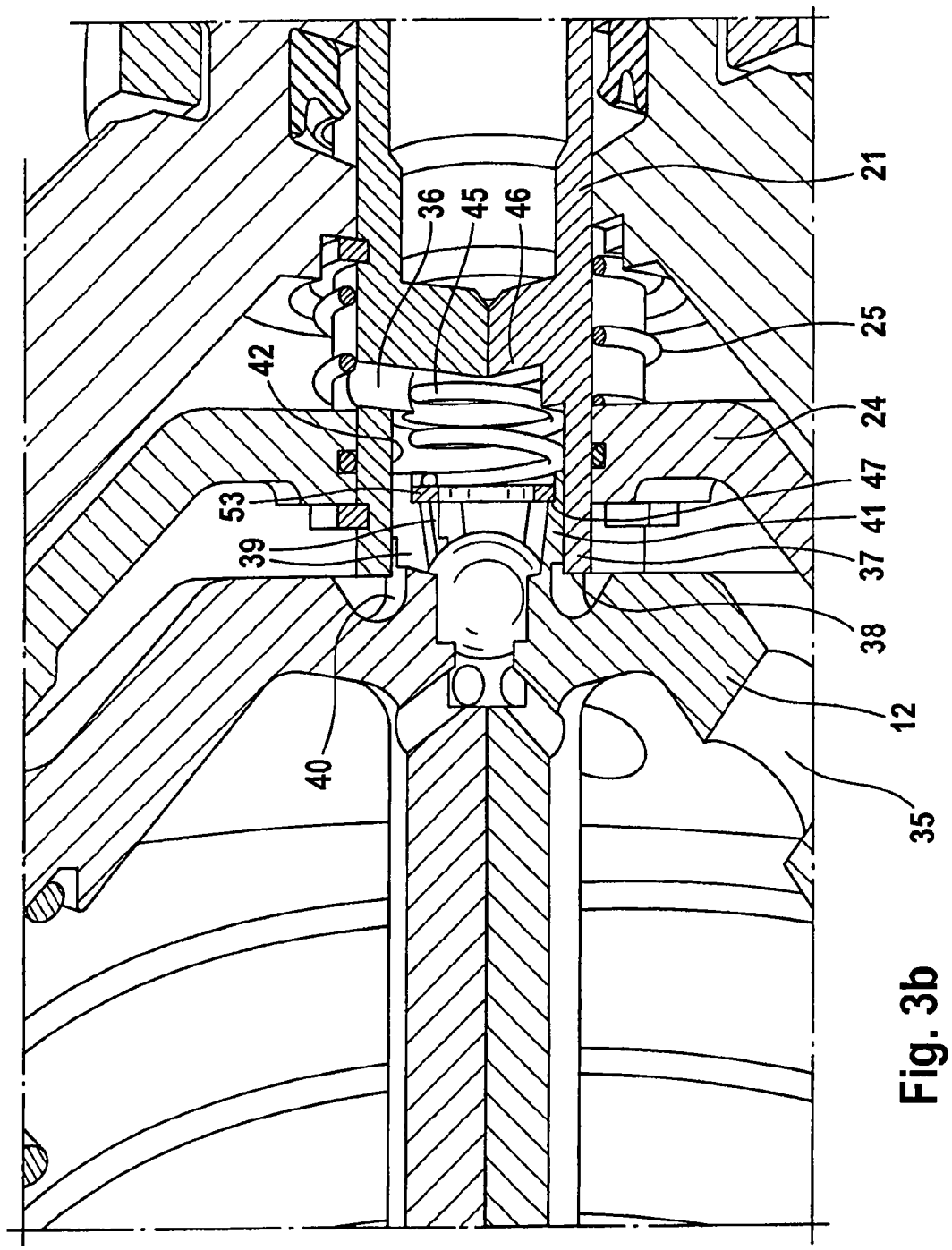
Figure 4:
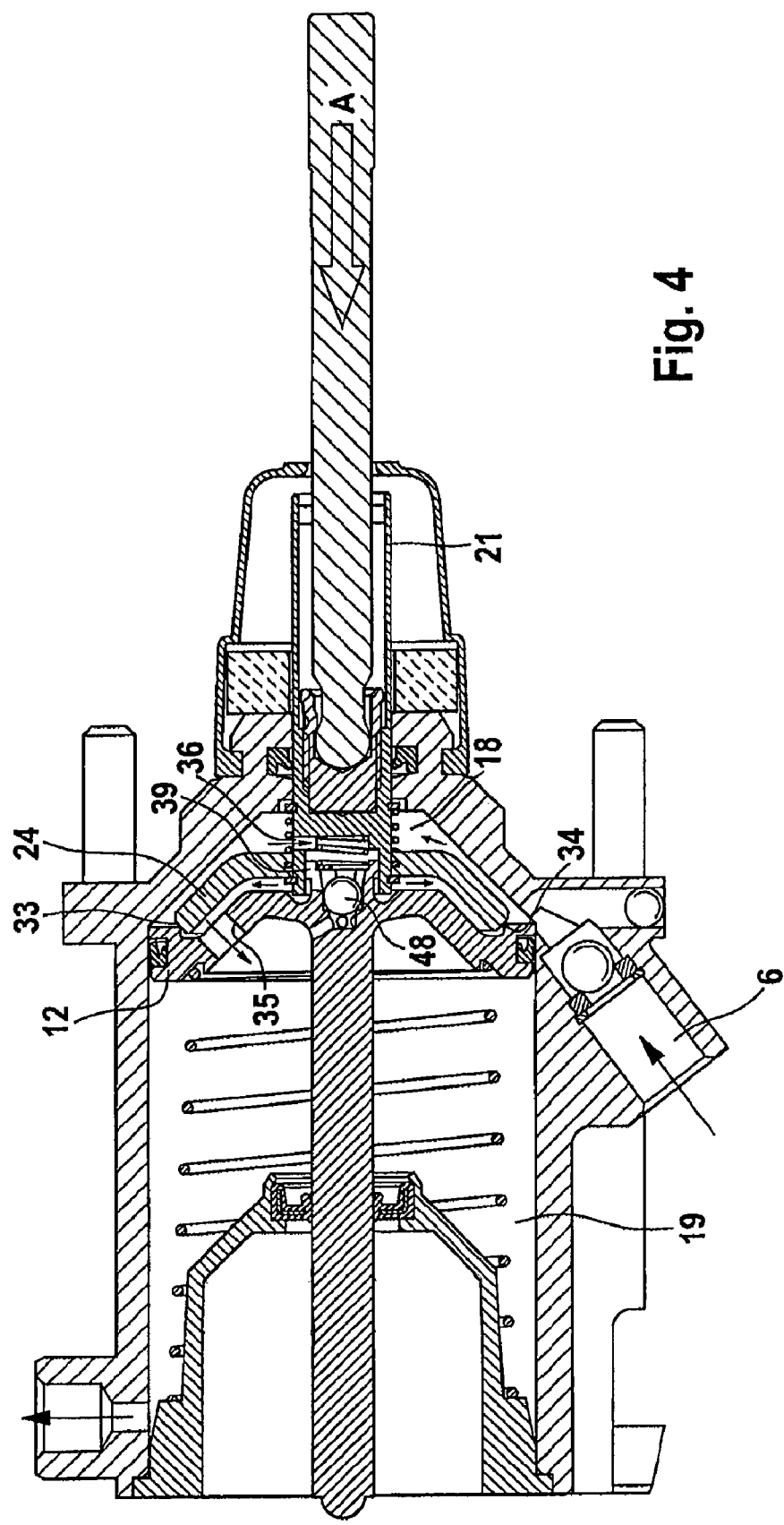
FIG. 4 shows the hydraulic booster of the brake pressure signal generator according to FIG. 2 at the start of activation, on an enlarged scale.
Figure 5:
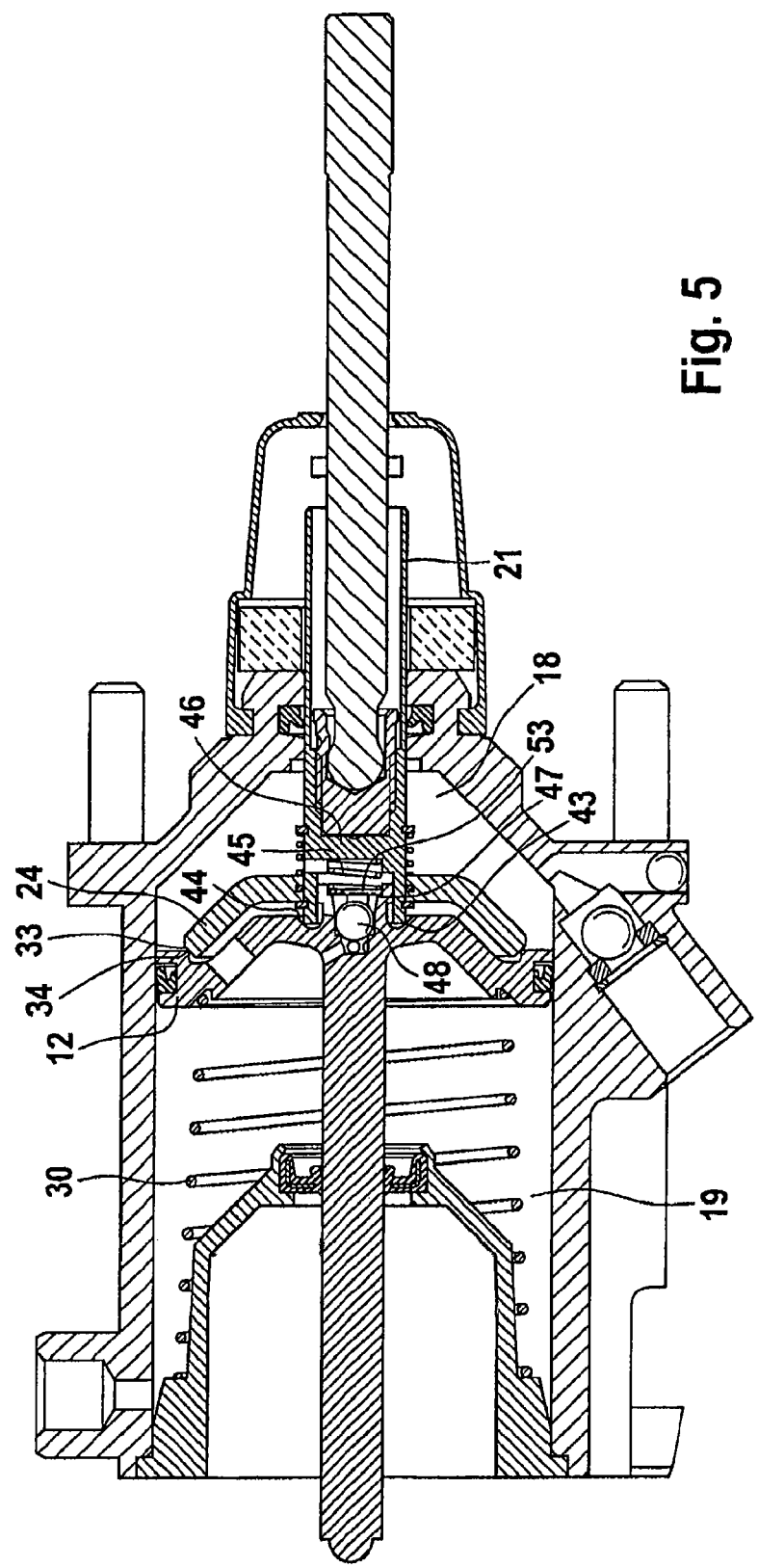
FIG. 5 shows the hydraulic booster of the brake pressure signal generator according to FIG. 2, in the case of activation, on an enlarged scale.

Further features of the booster 4 can be found in FIGS. 3 to 5, which show said booster 4 in an enlarged view and are described on the basis of the method of functioning of the booster 4. The master cylinder piston 14 is omitted from those figures for simplicity.

FIG. 3a shows the hydraulic booster 4 in an unactivated state. In said state, a volume flow of the steering pump 7 is fed unthrottled through the booster 4.

The hydraulic fluid can flow into the boosting chamber 18 via the inlet 6. In this state, the actuation piston 24 does not bear with its circumferential outer face 33 against a sealing edge 34 formed on the working piston 12, with the result that the hydraulic fluid can flow between the actuation piston 24 and the working piston 12 into the return flow chamber 19 via bores 35 in the working piston 12.

In addition, the hydraulic fluid can flow through one or more bores 36 in a pot-shaped end 37 of the control piston 21. The fluid flows from an interior of the pot-shaped end 37 through passages 39, formed in the working piston 12, between an end side 38 of the control piston 21 and an annular groove 40 arranged in the working piston 12, so as to pass into the return flow chamber 19 through the bores 35.

The hydraulic fluid flows out of the return flow chamber 19 in the direction of the reservoir vessel 8 via the outlet 9.

FIG. 3b shows the enlarged detail X in a spatial illustration. It is apparent that the working piston 12 has, for the purpose of guidance in the control piston 21, a cylindrical guide section 41 which is guided on an inner side 42 of the pot-shaped end 37 of the control piston 24, wherein the passages 39 (already described above) in the guide section 41 are embodied as slits.

FIG. 4 shows the booster 4 at the start of activation.

A force is applied to the control piston 21 as a result of the activation of the brake pedal in the activation direction A. This causes the actuation piston 24 to be brought to bear with the circumferential outer face 33 against the circumferential sealing edge 34 of the working piston 12. This prevents the volume flow of the steering pump 7 from flowing through between the actuation piston 24 and the working piston 12. The latter can then only flow in a throttled fashion through the bores 36 in the control piston 24 and the passages 39 in the control piston 12. This first stage of throttling of the volume flow results in a back-pressure in the boosting space 18.

This position of the booster 4 is comparable with the "jumper" in pneumatic vacuum underpressure boosters. The backpressure acts on the face of the actuation piston 24, the actuation piston 24 applies a force to the working piston 12 in the activation direction A, and both pistons 12, 24 begin to move in the activation direction A. At the same time, the backpressure acts on the face of the control piston 21, as a result of which an opposing force in the direction of the brake pedal builds up, which provides the driver with what is referred to as feedback.

The separate configuration of the working piston 12 and control piston 21 permits the jumper to be set by means of the diameter of the two components which can be configured in a variable fashion. In addition, the feedback can be set to a wide variety of customer requirements as a function of the piston diameter of the actuation piston 24.

As a result of further activation of the brake pedal, which activation is illustrated in FIG. 5, the control piston 21 reduces the flowed-through area of the slit-shaped passages 39 in the working piston 12 until complete abutment of a sealing edge 43 of the end side 38 of the control piston 21 occurs against a sealing face 44 which is provided in the annular groove 40 of the working piston 12. As a result, the back pressure in the boosting chamber 18 is increased further to maximum pumping pressure of the steering pump 7.

Maximum pressure is now present at the actuation piston 24 and at the working piston 12, which maximum pressure results in the maximum output force of the booster 4. The closing of the volume flow between the control piston 21 and the working piston 12 constitutes the second stage of throttling. The build up of pressure in the boosting chamber 18 is therefore carried out by means of two-stage throttling of the volume flow between the boosting chamber 18 and the return flow chamber 19.

When the brake pedal is released, the sealing edge 43 of the control piston 21 becomes detached from the sealing face 44 of the working piston 12 as a result of the spring force of a further spring element 45 which is arranged prestressed between the working piston 12 and the control piston 21. The spring element 45 is supported, as is also apparent, in particular, from FIG. 3b, on a base 46 of the pot-shaped end 37 of the control piston 21 and via a holding element 53 on a projection 47, protruding radially inwards, of the cylindrical guide section 41.

The actuation piston 24, i.e. its outer face 33, also becomes detached from the working piston 12 or its sealing edge 34, as a result of which the volume flow of the steering pump 7 can be fed again through the booster 4 without impedance. The spring element 30 in the return flow chamber 19 resets the entire piston unit 12, 24, 21 into the initial state.

In the event of failure of the steering pump 7, the braking takes place in a purely mechanical fashion and exclusively by means of the foot force applied at the brake pedal. In order to permit the pressure equalization between the return flow chamber 19 and the boosting chamber 18 in the case of a relative movement of the working piston 12 without hydraulic assistance, a nonreturn valve 48, which is configured as a ball valve and which is arranged in the working piston 12, opens. A mechanical fallback level of the booster 4 is therefore ensured.

Figure 6:
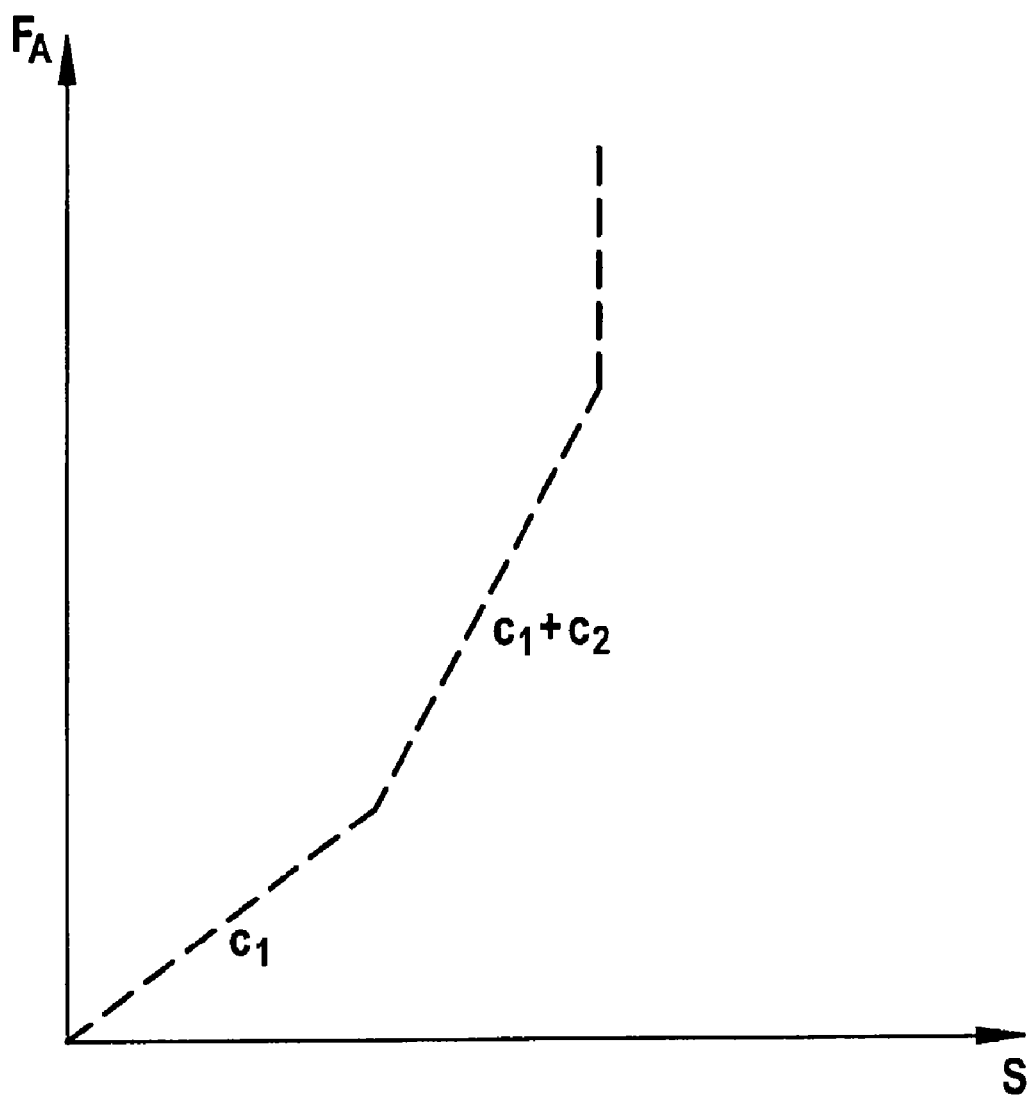
FIG. 6 shows a force/travel diagram of the hydraulic booster according to FIG. 2.
Figure 7:
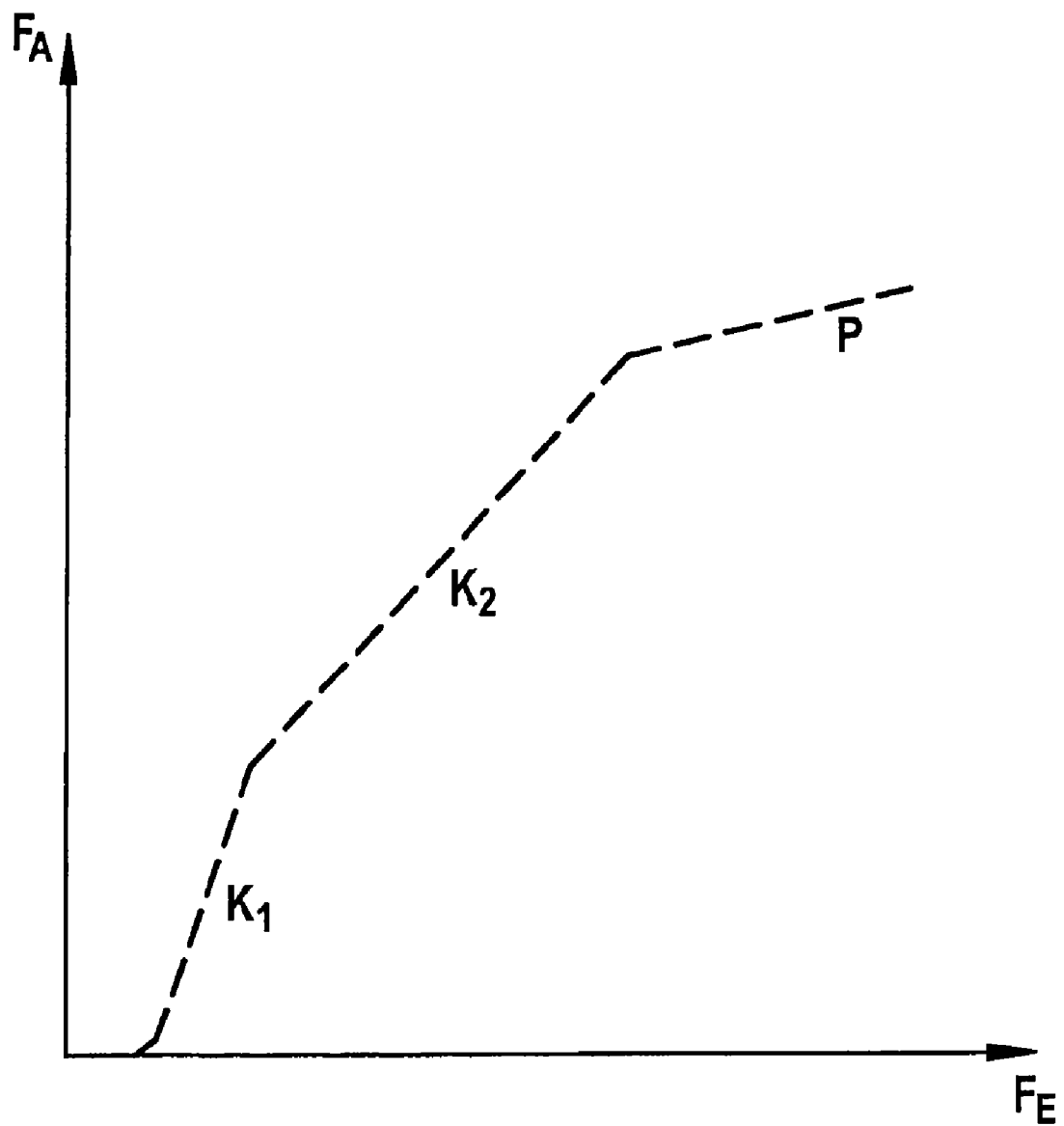
FIG. 7 shows a force/force diagram of the hydraulic booster according to FIG. 2.

FIGS. 6 and 7 respectively show a force/travel diagram and a force/force diagram of the described hydraulic boost 4, said diagrams showing the described states of the hydraulic booster 4.

Figure 8:
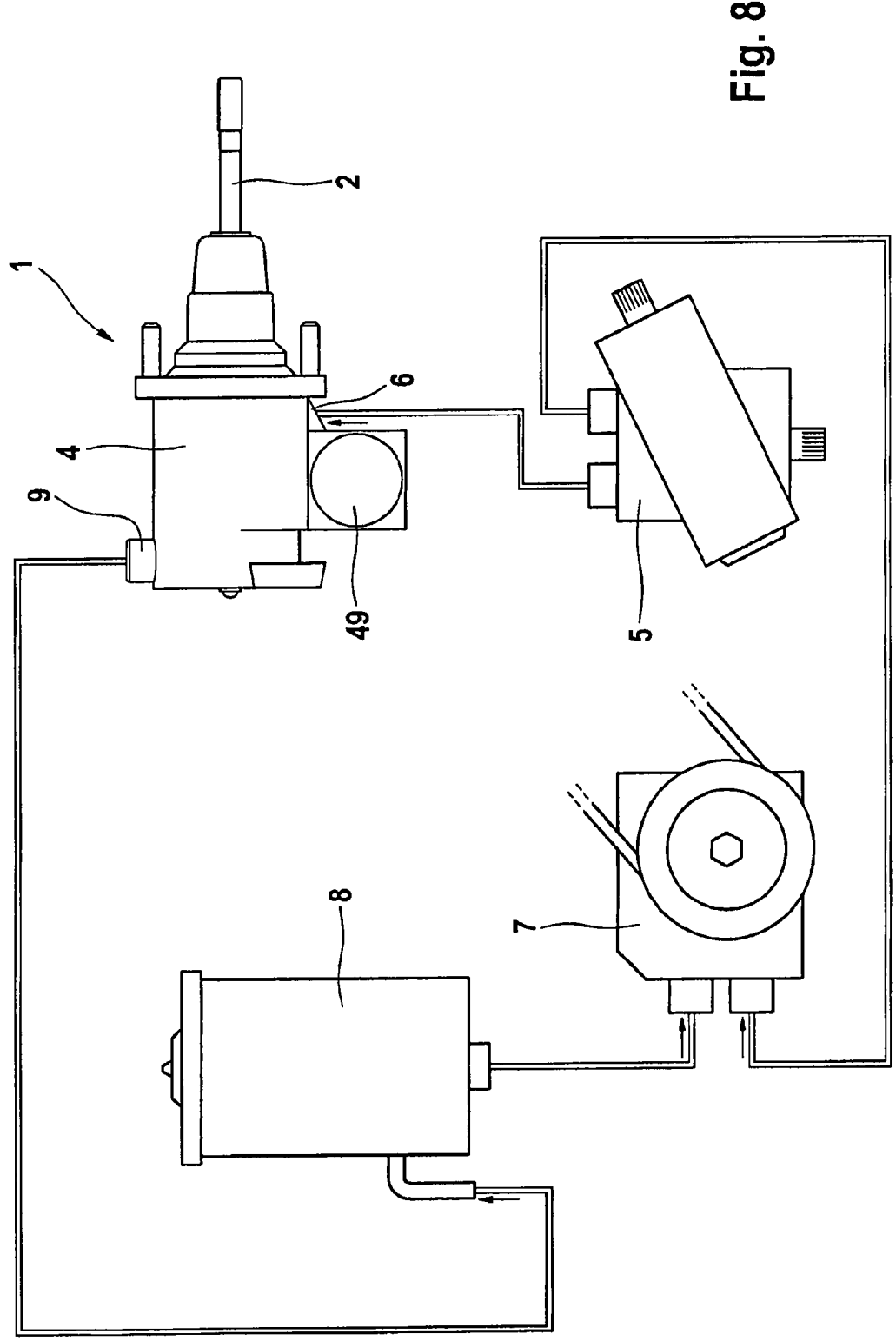
FIG. 8 shows a second exemplary embodiment of a motor vehicle brake system.

A second exemplary embodiment of a motor vehicle brake system according to aspects of the invention is illustrated in FIG. 8, which shows a hydraulic circuit diagram of the hydraulic vehicle brake system. Said diagram differs from the first exemplary embodiment only in having an additional electrical fallback level of the hydraulic booster 4, which fallback level is advantageous for heavy vehicles in which the foot force is not sufficient as a fallback level.

Generally, the hydraulic booster 4 of the second exemplary embodiment functions as described. In addition, in order to implement the electrical fallback level an electrically driven pump 49 is provided on the booster 4, which pump 49 feeds volume from the return flow chamber 19 into the boosting chamber 18 in the event of failure of the steering pump 7.

In the inlet 6 of the booster 4 a nonreturn valve (not shown) is provided, and a flow control switch 51 is arranged in the outlet 9.

Figure 9:
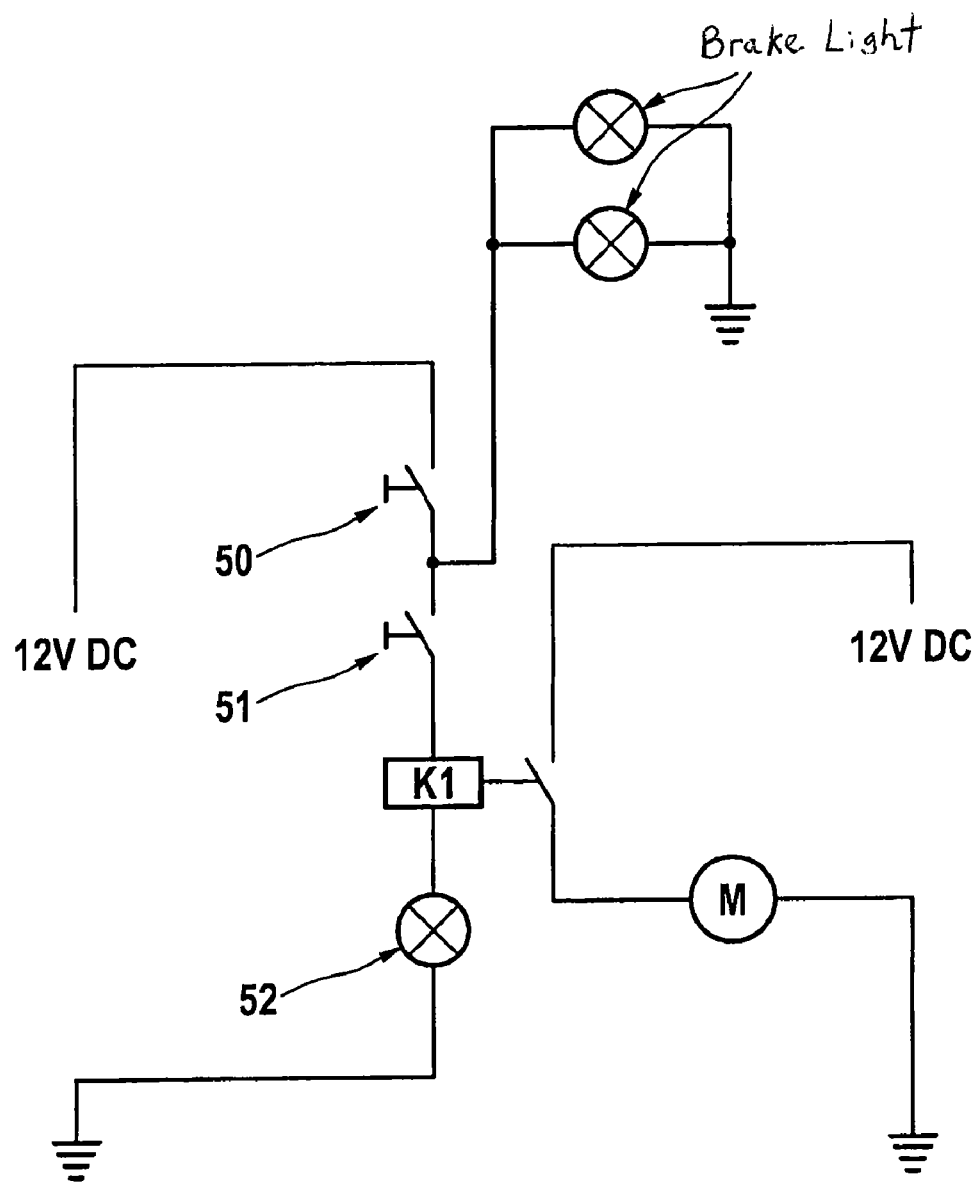
FIG. 9 shows an electrical circuit diagram of the system of FIG. 8.

FIG. 9 shows the electrical circuit diagram of the second exemplary embodiment.

In the event of failure of the steering pump 7, the braking does not take place exclusively via the foot force applied at the brake pedal, as described in the first exemplary embodiment.

The flow control switch 51 installed in the outlet 9 registers the stalling volume flow and closes. A brake light switch 50 and a relay are connected in series with said flow control switch 51. When the brake pedal is activated, the brake light switch 50 closes, resulting in the relay closing and the pump 49 starting. The pump 49 feeds hydraulic fluid from the return flow chamber 19 into the boosting chamber 18 of the booster 4. An excess pressure is built up there and the nonreturn valve in the inlet 6 closes.

In this way, an excess pressure is brought about approximately in the same way as with the steering pump 7, and the braking can take place. A warning lamp 52 informs the driver that the steering pump 7 has failed.

The invention claimed is:

1. Hydraulic vehicle brake system comprising:
   a brake pressure signal generator which can be activated by a brake activation device, wherein the brake pressure signal generator can be connected to wheel brakes of a vehicle via at least one hydraulic line and is composed of a master brake cylinder and a hydraulic booster which is connected upstream and which has a return flow chamber and a boosting chamber,
   a working piston arranged in the return flow chamber and the boosting chamber,
   a control piston,
   wherein the working piston is operatively connected in a force outputting direction to a master brake cylinder piston via an activation element,
   wherein a hydraulic pressure of a hydraulic pressure source can be applied to the hydraulic booster via an inlet for boosting braking force, wherein an outlet of the hydraulic booster is configured to be connected to a reservoir vessel, wherein the control piston has a plate-shaped actuation piston which is arranged thereon and which interacts with the working piston, and the control piston is guided in the working piston in such a way that, when the hydraulic booster is activated, two-stage throttling of a volume flow between the boosting chamber and the return flow chamber is made possible in order to build up pressure in the boosting chamber.

2. Hydraulic vehicle brake system according to claim 1, wherein the working piston has, for the purpose of guidance in the control piston, a cylindrical guide section which is guided on an inner side of a pot-shaped end of the control piston, wherein the guide section has one or more breakthroughs which permit first throttling of the volume flow, and wherein on an end side of the control piston, a sealing edge is provided which can be brought to bear against a sealing face of the working piston.

3. Hydraulic vehicle brake system according to claim 2, wherein the sealing face is formed in a circumferential annular groove of the working piston.

4. Hydraulic vehicle brake system according to claim 2, wherein the breakthroughs are provided as slits.

5. Hydraulic vehicle brake system according to claim 1, wherein the actuation piston is provided pre-stressed against a stop by a spring element in the force outputting direction, wherein the spring element bears against a further stop.

6. Hydraulic vehicle brake system according to claim 5, wherein the stops are provided as locking rings which are attached to the control piston.

7. Hydraulic vehicle brake system according to claim 1, wherein the working piston is embodied in a plate shape and has a sealing edge against which the actuation piston can be brought to bear with a circumferential outer face.

8. Hydraulic vehicle brake system according to claim 7, wherein an end side of the booster is embodied in a cone shape.

9. Hydraulic vehicle brake system according to claim 1, wherein the hydraulic booster has an electrical fallback level in addition to a mechanical fallback level.

10. Hydraulic vehicle brake system according to claim 9, wherein the booster has a nonreturn valve in the inlet and a flow control switch in the outlet, and an electrically driven pump is arranged on the booster, wherein in an event of failure of the pressure source the pump feeds the volume into the boosting chamber from the return flow chamber.

11. Hydraulic vehicle brake system according to claim 1, wherein the working piston and the activation element are provided in one piece.

12. Hydraulic vehicle brake system according to claim 1, wherein a nonreturn valve, which permits pressure equalization between the return flow chamber and the boosting chamber in the event of failure of the hydraulic pressure source, is provided between the working piston and the control piston.

13. A method for operating a hydraulic vehicle brake system including:

a brake pressure signal generator which can be activated by a brake activation device, wherein the brake pressure signal generator can be connected to wheel brakes of a vehicle via at least one hydraulic line and is composed of a master brake cylinder and a hydraulic booster which is connected upstream and which has a return flow chamber and a boosting chamber, a working piston arranged in the return flow chamber and the boosting chamber, a control piston, wherein the working piston is operatively connected in a force outputting direction to a master brake cylinder piston via an activation element, wherein a hydraulic pressure of a hydraulic pressure source can be applied to the hydraulic booster via an inlet for boosting braking force, wherein an outlet of the hydraulic booster is configured to be connected to a reservoir vessel, wherein the control piston has a plate-shaped actuation piston which is arranged thereon and which interacts with the working piston, and the control piston is guided in the working piston in such a way that, when the hydraulic booster is activated, two-stage throttling of a volume flow between the boosting chamber and the return flow chamber is made possible in order to build up pressure in the boosting chamber, wherein the method comprises building up pressure in the boosting chamber by two-stage throttling of the volume flow.

14. Method for operating a hydraulic vehicle brake system according to claim 13, wherein, at the start of activation of the booster, first throttling of the volume flow takes place, through which a backpressure is produced in the boosting chamber, and the backpressure acts on the control piston with a result that an opposing force is built up in a direction of a brake pedal.

15. Method for operating a hydraulic vehicle brake system according to claim 14, wherein, in the case of further activation, second throttling of the volume flow takes place, with a result that the backpressure in the boosting chamber is increased to a maximum pressure of the hydraulic pressure source.

16. Method for operating a hydraulic vehicle according to claim 13, wherein in the event of failure of the hydraulic pressure source a mechanical fallback level is provided, wherein a nonreturn valve between the working piston and the control piston permits pressure equalization between the return flow chamber and the boosting chamber.

17. Method for operating a hydraulic vehicle brake system according to claim 16, wherein an electrical fallback level is provided which is activated by a control switch in the outlet of the booster, and by a brake light switch.

18. Method for operating a hydraulic vehicle brake system according to claim 17, wherein an electrically driven pump is activated which, in an event of failure of the pressure source, feeds volume into the boosting chamber from the return flow chamber.

* * * * *